Dec. 12, 1961     J. H. WILLIS     3,012,373

LEVEL CONTROL MEANS

Filed Dec. 30, 1957

INVENTOR.
JOHN H. WILLIS

BY

ATTORNEYS

United States Patent Office 3,012,373
Patented Dec. 12, 1961

3,012,373
LEVEL CONTROL MEANS
John H. Willis, Anderson, S.C., assignor to Owens-Corning Fiberglas Corporation, a corporation of Delaware
Filed Dec. 30, 1957, Ser. No. 706,021
9 Claims. (Cl. 49—54)

This invention relates generally to liquid level measurement and control, and is more particularly directed to a method and means for electrically detecting, measuring, and regulating the level of fluid materials such as molten glass in melting units.

As is well known, the maintenance of an exacting level of liquid material within a container is extremely important in many manufacturing operations, both for maintenance of operating stability of processing equipment involved, and often more importantly, for maintenance of quality in products produced. The manufacture of glass fibers for textile strands and yarns is one manufacturing process requiring such control, and one of the processes to which the present invention is particularly adaptable. By way of example, the manufacture of continuous glass fibers by mechanical attenuation for textile products involves the withdrawal of molten glass from a container while the molten material is maintained at a constant temperature. The orifices of a feeder associated with such a container of molten glass are usually located on the underside of the container and are subjected to the head of molten material thereabove. Upon withdrawal of material from the orifices, the head of the material is an important factor determining the diameter of the fibers being attenuated. The maintenance of a constant level, or constant head of material above the orifices therefor plays an important part in determination of the uniformity of diameters of the plurality of fibers produced as well as the end to end diameter of each such fiber. In view of the ever increasing demand for such fibers, and their wide range of use for industrial purposes, the tolerances, or tolerable range of variation for general use has been constantly narrowed to present day requirements of less than 1% diameter control for fiber diameters generally in the order of twenty-two one hundred thousandths of an inch. To establish such production on a constant basis it becomes necessary, beside exercise of exacting temperature and viscosity controls, that the head of the liquid be also exactingly controlled to practically negligible variations in level.

It is a principle of the present invention to provide an economical method and means for exactingly controlling the level of materials in liquid form within a container.

It is another object of the invention to provide a liquid level control adaptable to detection and maintenance of a level within an extremely small range and quickly active to correct even the slightest of deviation from a preselected value.

It is still another object of the present invention to provide a level detection and control means adaptable to maintenance of given liquid levels, such method and means being capable of withstanding high temperatures to permit its use in the maintenance of levels of molten fluids.

Another and still further object of the present invention is to provide a liquid level detection and control arrangement adapted to maintenance of molten fluid levels, and which is continuously modulating and adaptable to varying rates of feed of raw material to the liquid body, dependent upon the degrees of deviation in the level from a predetermined desired value.

The above objectives are attained according to the present invention by providing means for measuring the degree of contact between a fixed probe and the liquid level to be regulated. In accomplishing such an arrangement according to the present invention, the electrical conducting property of the fluid being controlled in depth is utilized to, in effect, measure the resistance between a stationary probe tip and the fluid at the surface of the body. In this respect, the resistance of the probe in conjunction with the liquid body, as determined by the depth of immersion of the tip into the liquid, is utilized as a control factor in determining the rates of feed necessary to return the level of the liquid to the desired value. Thus, a predetermined circuit current or resistance value is matched to a preselected desired level of the liquid, and deviations therefrom are arranged to provide a signal which acts to initiate a feed rate which in turn acts quickly to return the liquid level to desired value. In a sense, the probe to fluid resistance is related to the area of contact between the probe and the fluid, and is inversely related to the area of contact between the probe and the material. The probe circuit current is representative of this resistance and is amplified as a signal for use in regulating the feed mechanism at rates proportional to the signal. Thus, where a process requires the continual removal of fluid material from the container, it can be arranged to have a constant level of fluid by establishing a feed of raw material thereto at rates matched to the rates of withdrawal of fluid therefrom.

Features of the invention lie in the quick response of the method and means to variations in level of material being detected, as well as the constant modulation of such arrangement for continuous regulation of rates of feed of material to the liquid body being controlled.

Another feature of the invention lies in the fact that no moving parts are required, as well as the long life obtainable with a minimum of maintenance.

A further feature of the invention lies in the provision of signals proportional to changes in the liquid level being controlled, and the capabilities of holding levels to within + and −.01″.

A still further feature of the invention lies in the fact that a level detection and replenishing feed is accomplished, dependent upon rates of removal of material from the liquid body with practically no overshoot in the corrective adjustment of the level desired.

Other objects and features which I believe to be characteristic of my invention are set forth with particularity in the appended claims. My invention itself, however, in both organization and manner of construction, together with further objects and advantages thereof, may be best understood by reference to the following description taken in connection with the accompanying drawings in which:

It will be understood that although the invention as herein described and illustrated is disclosed in conjunction with glass fiber forming operations, the invention has much broader application and is adaptable to measurement and control of the level of practically any electrically conducting material, even those having extremely small electrical conducting properties.

Figure 1:
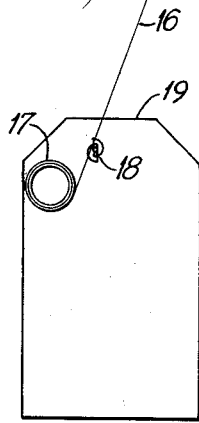
FIGURE 1 is a somewhat schematic and diagrammatic illustration of the arrangement of apparatus for producing glass fibers wherein the liquid level of the glass in the feeder or bushing from which the fibers are attenuated is controlled by the electrical probe arrangement of the present invention.

Referring to the drawing in greater detail, FIGURE 1 shows a molten glass feeder 10 containing a molten body of glass 12 which is supplied with heat and maintained at a uniform temperature by direct passage of electrical current through the feeder by way of power connections to its oppositely disposed terminals 11. Continuous fibers 13 are attenuated from orifices in the bottom of the feeder 10 and are gathered together into a strand 16 by passage over a gathering member 14. The fibers are supplied with sizing fluid at the gathering member from a supply tube 15 connected to a source of such sizing material (not shown). The successively formed portions of the strand 16 are thereupon wound into a package 17 by a winder 19 as the strand is caused to traverse the package by a spiral wire-type traverse mechanism 18.

The heating current of the feeder or bushing 10 is alternating current supplied over a main power supply line by way of conductors L1 and L2. The power source, for example, may be a 440 volt, 60 cycle source not shown. The A.C. is supplied to the feeder through a transformer 20 which reduces the voltage, for example, to a value in the order of 2 volts, which; since the feeder 10 is made of low resistance high temperature metal such as platinum; is capable of providing heating current in the order of one or more kilo-amperes. The primary loop of the power circuit for the feeder 10 contains a saturable core reactor 21 which acts as a variable impedance to permit adjustment of the current flow through the feeder for the temperature desired. The saturable core reactor is cooperatively associated with a thermocouple 22 attached to the side of the feeder 10 to sense and generate an electrical signal corresponding to the feeder temperature.

The thermocouple 22 is connected to an amplifier 23 which amplifies the temperature signal supplied from the thermocouple to a regulator 24. The regulator in turn supplies direct current to the saturable reactor 21 to modify the impedance offered by the reactor in the primary of the feeder power circuit to provide automatically a fixed feeder temperature. When the temperature of the feeder tends to rise above a value preselected by adjustment at the regulator 24, the direct current supplied from the regulator to the saturable core reactor 21 is reduced, thereby enlarging the impedance offered by the reactor 21 and diminishing the current flow in the secondary or feeder loop. If the temperature of the feeder tends to drop below the preselected value, the regulator acts to supply additional direct current to the reactor 21, thereby reducing the reactor impedance and increasing the current flow in the secondary loop for a rise in temperature in the feeder 10. The feeder thereby is maintained at a relatively fixed temperature regardless of the rate of withdrawal of fibers therefrom.

The molten body 12 in the feeder 10 from which the fibers 13 are attenuated is replenished with molten material supplied from an orificed premelting unit 30 disposed above the feeder or bushing 10. The pre-melting unit is electrically heated by passage of electrical current therethrough from its terminals 31 which are connected to an electrical energy source through a power transformer 40 by conductors L1 and L2. The molten body 32 within the premelting unit 30 is a melt down of solid quantities of the material fed thereto, such as marbles 36 supplied from a hopper 35. The marbles are supplied in bulk form and are fed to the molten body 32 at a rate determined by the melting rate corresponding to the magnitude of electrical current flowing through the unit 30. The more current flowing through the premelting unit 30, the greater is the rate of consumption of marbles from the hopper 35 and, correspondingly, the faster is the rate of supply of the molten material therefrom in the form of a stream 33 flowed through the orifice in the bottom of the premelting unit.

According to the present invention the rate of flow of material in the stream 33 to the body 12 is matched to the rate of withdrawal of the molten material from the body 12 by continuous modulation provided by a level-control circuit which regulates the current flow and correspondingly the melting rate of the premelter unit 30. The level is sensed by a probe 42 having a tapered tip 48 in contact with the surface of the molten body in the feeder. A potential difference is established between the probe and the body 12 in the feeder by electrical connections to a transformer 52 through a voltage divider 54. The transformer 52 is connected to an energy supply line 51 and transforms the supplied voltage to a relatively low voltage in its secondary 53 for supply to the voltage divider 54. A variable tap 47 of the voltage divider allows selection of the voltage to be applied across the feeder and body 12 through a terminal 11 and the probe 42. A coupling transformer 55 in series with the probe 42 transmits a current signal from the circuit loop incorporating the probe to an amplifier 43, which in turn supplies the amplified current signal to a regulator 44. The regulator 44 is connected to a saturable core reactor 41 in the primary of the power circuit for the premelter 30. The amplifier 43 and regulator 44 are conventional in circuitry and a detailed description is accordingly not necessary in the present instance. Their function, in combination, is to amplify the probe loop current signal and to provide a translated electrical signal from the regulator which will constantly monitor the flow of current in the premelter 30 to regulate the flow of glass in the stream 33 to replenish the glass withdrawn from the feeder 10.

It has been found that variations in depth of a probe from a point at which contact is just made with the surface of the molten body of glass 12 to a depth as little as ⅛ of an inch can be made to cause sufficient variation in contact resistance and current in the probe loop, corresponding to a range of levels in the feeder so that the current can be used as an index of the level in the feeder as well as to regulate such level. Accordingly, a desired level in the feeder 10 can be preselected by adjustment in the regulator 44 for establishment of a corresponding current flow in the probe loop as standard.

The taper of the probe is found to be desirable in view of the more rapid increase in area of contact it offers upon rises in level of contacted fluids from the point to the base of the tip which in turn provides a greater variation in resistance or degree of contact with the molten body as the level varies any given amount. A cylindrical tip will also operate according to the principles of the invention, but with less sensitivity than the cone since the variation of area of contact of the probe with given variations in level of the body measured will not be as rapid as with a tapered tip probe.

Figure 2:
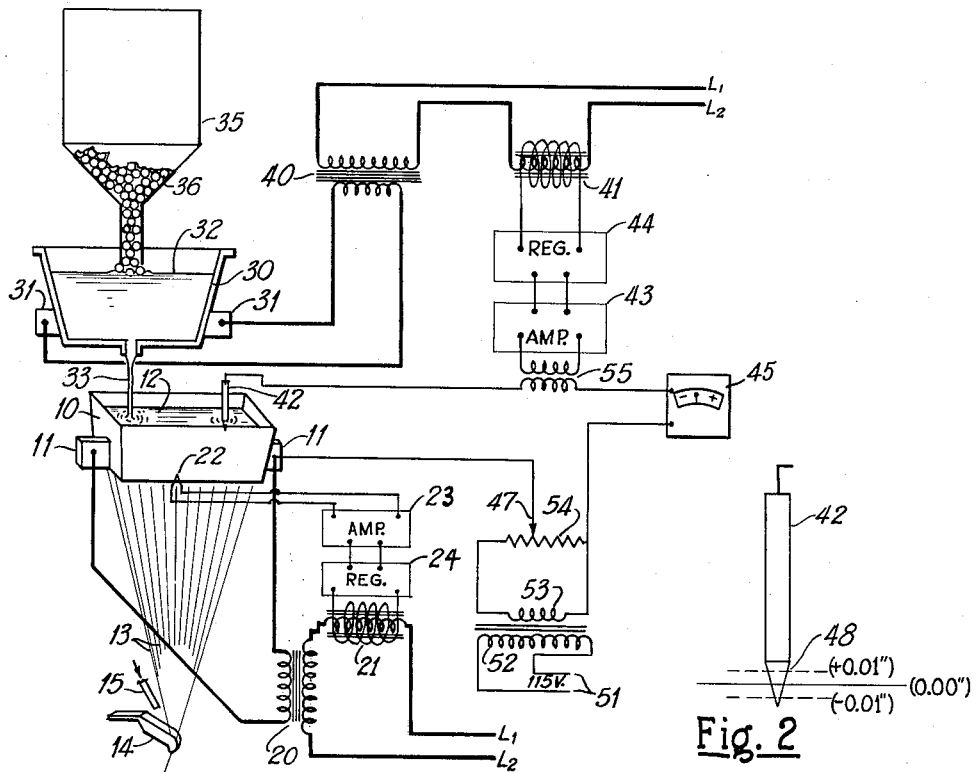
FIGURE 2 is an enlarged view of a probe immersed in the liquid feeder or bushing of FIGURE 1.

Glass levels have been maintained with an arrangement so described in the order of + or −.01″ as illustrated in FIGURE 2.

In operation, the probe 42 is mounted in a fixed reference position over the body 12 so that the given level desired corresponds to a predetermined degree of immersion of the probe into the molten material, say for example, to a depth such that the tip 48 of the probe extends 1/32 of an inch below the surface of the material. The current flow in the probe loop when the level of the molten body causes the material to make contact with the probe to this extent is established as a standard current value above which and below which the regulator acts to modify the current flow in the premelter. If the level of glass in the body 12 reaches a height above the standard desired level, then the current flow in the probe loop increases an amount proportional to the rise in level above the desired level. The increased current flow is then amplified by the amplifier 43 and supplied to the regulator, which in turn supplies proportionately less direct current to the saturatable core reactor 41 to increase the impedance in the power circuit of the premelter 30. The temperature of the premelter is thus proportionately reduced to increase the viscosity of the body 32 and thereby correspondingly reduce the quantity flowing in the stream 33. Concomitantly, the rate of melting the solid material 36 is also proportionately reduced. With a reduced flow of material in the stream 33 the level of the body 12 is thus lowered until the standard desired level is re-established.

Should the level of the body 12 tend to fall below the standard desired height, the resistance in the probe loop begins to approach infinity corresponding to the level dropping below the probe tip. The probe current and correspondingly the amplified signal supplied to the regulator 44 is reduced to cause a proportional increase in the direct current supply to the saturable core reactor 41, thereby allowing proportionately more current to flow through the premelter 30 and a greater volume of material to flow in the streams 33 dependent upon the magnitude of deviation of the level from the desired level. Concomitantly, the rate of melting of the solid material 36 is also increased, thereby acting to raise the level of the body 12 until the standard desired level $\frac{1}{32}$ of an inch above the probe tip apex is re-established.

In view of the foregoing, it is apparent that a constantly modulated level control circuit is provided whereby any slight deviation of the liquid from a desired level is immediately amplified and acted upon by the regulator to change the rate of flow material in the stream 33 to re-establish the desired level.

Features of the circuit lie in its simplicity as well as the fact that the probe loop supplying current through the molten mass can be effectively operated at low voltages with consequent minimum tendencies toward plating of metal of the probe and feeder on each other or on other parts associated with the current conducting melt 12. The low voltage arrangement also lends to establishment of a symmetry in the A.C. wave in the probe loop supplied from the transformer 52, thereby further lending to minimization of plating effects.

As an example of component values for a circuit successfully operable according to the principles of the present invention, when the resistance between the molten body and the probe itself at the desired level is in the order of 2000 ohms, the voltage supplied to the probe loop by the voltage divider 54 may be in the order of six volts, while the impedance in the probe loop reflected from the amplifier and regulator through the coupling transformer 55 may be in the order of from four to five hundred ohms.

Glass levels have been maintained with an arrangement so described in the order of + or −.01 inch as illustrated in FIGURE 2.

Another feature of the invention lies in the fact that the percentage of accuracy of depth increases as the level to be controlled increases in depth. That is, whereas + or −.01 of an inch of level control is control to an accuracy of 1.0% for a body of one inch depth, the control offers a .1% accuracy when the depth is ten inches.

Figure 3:
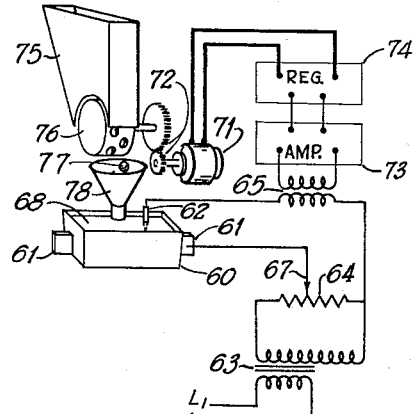
FIGURE 3 is another schematic and diagrammatic illustration of an arrangement for producing fibers from molten glass wherein the level control of the present invention is utilized to supply raw material to the feeder in solid form.

Although the invention has been described above in relationship to modulation of flow of material to a molten body, FIGURE 3 illustrates another arrangement whereby the principles of the present invention may be applied to modulation of a supply of solid material to a molten body. A feeder 60 from which fibers are withdrawn as in the arrangement in FIGURE 1 contains a molten body 68 heated by passage of current through terminals 61 of the feeder. The level of the molten body 68 is detected by a probe 62 connected according to the principles of this invention so that current flow in the loop supplying or establishing a potential difference between it and the feeder 60 is modified with the variation in the level of the body 68. With variations in area of contact of the probe tip upon variation in level of the molten body 68, corresponding variations in current magnitude occur in the probe loop. The probe loop potential isprovided by a control transformer 63 connected to a power supply line by way of conductors L1 and L2. The transformer potential is in turn made adjustable through a voltage divider 64 with a tap 67 connected directly to a terminal 61 of the feeder 60. Current variations are fed through a coupling transformer 65 to an amplifier 73 which in turn feeds the amplified signal to a regulator 74.

Solid matter in the form of marbles is supplied to the molten body 68 through a funnel or guide tube 78. The marbles are contained in a hopper 75 having an associated rotary feeder 76. The rate of supply of marbles from the hopper to the molten body is established by the rotational speed of a motor 71 which is geared through a speed reducer 72 to the rotary feed mechanism 76.

When the level of the molten body 68 falls below a predetermined desired height determined by the probe position, the current flow in the probe loop is reduced by reason of the reduced area of interfacial contact of the molten material with the probe tip. The reduced current flow is arranged to cause a corresponding increase in voltage at the rotary drive 71 through the regulator 74. The increased voltage results in an increase in speed of the rotary feeder 76 and a corresponding increase in the rate of feed of the material, faster than the rate of withdrawal from the molten body 68.

Should the level of the body 68 increase above the predetermined height, the regulator reduces the voltage at the drive 71 as determined by the amplified probe current signal supplied to the regulator so that the rate of feed of solid material to the body is reduced.

Although it will be apparent that the regulator might be arranged to provide an on-off signal to the drive 71 to provide solid material to the body 68 when the level thereof drops below a predetermined height and to cut off the supply of solid material when the height is exceeded, it is preferable that a fully modulated arrangement be provided wherein the rate of feed of the marbles is adjusted for the height of the molten body at each instant.

In adapting the level control to sensing, measuring and regulating the level of fluids of materials other than glass, the measurement is first preferably made of the contact resistance between the probe and fluid when the probe is fixed with its tip partially submerged for a preselected standard level above which and below which corrections for deviations are to be made. The impedance or resistance of the amplifying and regulating branches as viewed from the probe loop is then proportionally designed to provide readily detectable current variations in the loop with changes in the degree of submersion of the probe upon variation of the liquid level. The regulator is presettable to allow selection of the standard current above which and below which corrective D.C. current values are supplied to the saturable core reactor for modification of the rate of feed of material to the body being measured. In this respect, a unit commercially sold under the names of the "Wheelco Capacitrol" unit sold by the Barber-Colman Co., or the "Pyro-Vane" unit sold by the Minneapolis Honeywell Co., Philadelphia, Pa., are adapted to providing corrective signals on either side of a selected standard to bring about the desired conditions in an associated loop or branch circuit as are other instruments of such type made by other instrument manufacturers such as the Leeds and Northrup Company and the Bristol Instrument Company. A magnetic amplifier circuit associated with the saturable core reactor and supplied with amplified signals from the probe loop has also been found to be extremely effective in providing the corrective signals desired for establishment of preselected standard conditions.

Instead of or in addition to an amplifier and associated regulator being connected in the probe loop, a direct indicating means such as a milliammeter 45 or ohmmeter might be inserted in the loop as shown in FIGURE 1 to indicate the level of the material being measured. In this respect, the milliammeter can be graduated with a central zero reference corresponding to the desired level of liquid being measured as well as actual deviations above and below the desired level. Although A.C. has been indicated as preferable for operation of the present level control, D.C. is also useable. With A.C., however, probe electrolitic corrosion has been found considerably less. Amplification of A.C. is also more stable. Additionally, relatively small amplified A.C. signals are readily converted to D.C. which can be magnified by suitable conversion means such as the Wheelco unit or the magnetic amplifier arrangement outlined above.

In view of the foregoing, it will be understood that while I have shown certain particular forms of my invention, I do not wish to be limited thereto since many modifications may be made within the concept of the invention and I, therefore, contemplate by the appended claims to cover all modifications which fall within the spirit and scope of my invention.

I claim:

1. A liquid level detector comprising a probe adapted to connection to a source of electrical energy, said probe being fixedly disposed for contact with the surface of a liquid with the tip of the probe stationary and at all times partly submerged in the liquid, said probe tip having an increasing cross-sectional area from its extreme end to a point above the maximum level of the liquid to be indicated, a source of electrical energy connected to establish a potential difference between the liquid and probe, and means for measuring electrical current connected in the probe circuit thus formed sufficiently sensitive to indicate variations in the area of contact of the liquid with the probe tip, to correspondingly indicate the level of the liquid with respect to the probe.

2. A liquid level detector comprising an electrically conductive probe, a source of electrical energy, and means for measuring electrical current, said probe having a stationary tapered tip and being fixedly disposed to extend from a reference position to a point where its tip is at least partially submerged below the liquid level being detected; said electrical energy source being connected to said probe and being arranged to establish a potential difference across said probe tip and liquid, said current measuring means being connected for measurement of differences in the magnitude of current flow through the area of said stationary probe tip contacted by the liquid with changes in the liquid level as an index of the level of the liquid with respect to said reference position.

3. A level control system for a liquid body of material comprising a container for such body, a source of such material disposed to replenish material removed from said body, a stationary electrical current conducting probe disposed to extend from a reference position to a level at which its tip is partially submerged at all times below a predetermined level of such material in said container, said probe tip having an increasing cross-sectional area from its extreme end to a point above the maximum level of the liquid to be controlled, a source of electrical energy, means for measuring current flow, said energy source being connected to said probe to establish a potential difference across the probe and material, said measuring means being sufficiently sensitive and being connected for measurement of variations in current flow through the submerged portion of the tip of the stationary probe as an index of the level of the liquid with respect to said reference position, means for varying the rate of supply of material from said source of material, and means adapted to receive signals corresponding to said probe current measurements to control said rate varying means for feed of material to said body according to deviations from said predetermined desired level.

4. A level control system for a molten body of heat softenable material comprising a container for such body of material, a source of a continuously flowing molten stream of such material disposed to replenish material removed from said body, an electrical current conducting probe fixedly disposed to extend from a reference position with its tip constantly in partial submersion below a predetermined level for molten material in said container, a source of electrical energy, said probe tip having an increasing cross-sectional area from its extreme end to a point above the maximum level of the liquid to be controlled, means for sensing current flow, said energy source being connected to said probe and to establish a potential difference across the probe tip and the molten material, said current sensing means being connected for sensing current flow through the submerged portions of the probe tip as an index of the level of the liquid with respect to said reference position, said current sensing means being sufficiently sensitive to sense variations in current caused by variations in area of contact of said probe with said liquid, means for varying the viscosity of the stream flowing from said source to said body thereby to regulate the rate of supply of material to said body, and means adapted to receive signals corresponding to said probe current measurements to control the viscosity of said stream for feed of material to the body at a rate varied according to deviations from said predetermined desired level.

5. A method for measuring the level of a liquid comprising fixing an electrically conducting probe in a stationary position in which its tip is partially submerged below the level of the liquid, said probe tip having an increasing cross-sectional area from its extreme end to a point above the maximum level of the liquid to be measured, establishing a difference of potential between said probe and liquid to establish current flow through said probe, and detecting variations in the magnitude of current flow from a preselected current flow through the submerged portion of the stationary probe tip as an index of the level of said liquid with respect to the probe.

6. The method of measuring the level of a liquid comprising fixing a probe in a stationary position with its tip partially submerged at all times below the level of the liquid, said probe tip having an increasing cross-sectional area from its extreme end to a point above the maximum level of the liquid to be measured, electrically measuring the amount of contact of the stationary probe tip with said liquid, establishing a desired liquid level corresponding to a given probe contact measurement as reference, and utilizing deviations in probe contact measurement from said reference measurement to indicate the level of the liquid.

7. The method of maintaining a preselected level of a contained body of molten glass from which molten glass is continuously removed and to which material is fed continuously in replenishment comprising partially immersing the tip of an electrically conducting probe stationarily in said liquid below said preselected level, said probe tip having a gradually increasing cross-sectional area from its extreme end to a point above the maximum level of the liquid to be controlled, establishing a difference of potential between said probe and body of molten glass, measuring the electrical current flow through said stationary probe due to the contact of said probe with said body of molten glass, establishing a desired level for said body corresponding to a given probe current measurement as reference, and utilizing current deviations from the reference current value to proportionally regulate the feed of the material to the body to accordingly retain the amount of tip immersion and the level of the body substantially constant.

8. The method of claim 7 wherein the feed of material to the body is regulated so as to be varied dependent upon the magnitude of deviation in the current measurement from the reference value.

9. The method of regulating the level of a contained molten body of heat softenable material from which material is removed comprising feeding such material in molten condition to said body from a melting unit, partially immersing an electrically conducting probe below the level of said molten body, establishing a difference of potential between said probe and molten body, measuring the current flow through said probe due to contact of said probe with said molten body, establishing a desired level corresponding to a given probe contact and current measurement as reference, and supplying control signals corresponding to current deviations from the reference current value to control means continuously varying the temperature and viscosity of the molten material fed to the body from the melting unit in order to vary the rate of feed from the melting unit as determined by the magnitude of deviation from the desired level.

References Cited in the file of this patent

UNITED STATES PATENTS

| | | |
|---|---|---|
| 2,224,403 | Lines | Dec. 10, 1940 |
| 2,465,283 | Schlehr | Mar. 22, 1949 |
| 2,470,510 | Matson et al. | May 17, 1949 |
| 2,535,569 | Toensfeldt | Dec. 26, 1950 |
| 2,602,125 | Crawford et al. | July 1, 1952 |
| 2,698,539 | Gridel et al. | Jan. 4, 1955 |
| 2,871,874 | Coles | Feb. 3, 1959 |